(12) United States Patent
Wirthlin

(10) Patent No.: US 7,109,512 B2
(45) Date of Patent: Sep. 19, 2006

(54) OPTICAL TRANSDUCER FOR DETECTING LIQUID LEVEL AND ELECTRICAL CIRCUIT THEREFOR

(75) Inventor: Alvin R. Wirthlin, Lucas, TX (US)

(73) Assignee: Opti Sensor Systems, LLC, Lancaster, VA (US)

( * ) Notice: Subject to any disclaimer, the term of this patent is extended or adjusted under 35 U.S.C. 154(b) by 0 days.

(21) Appl. No.: 10/924,395

(22) Filed: Aug. 23, 2004

(65) Prior Publication Data

US 2005/0236592 A1    Oct. 27, 2005

Related U.S. Application Data

(63) Continuation-in-part of application No. 10/829,772, filed on Apr. 22, 2004.

(51) Int. Cl.
G01N 15/06 (2006.01)
G01N 21/85 (2006.01)
G01N 21/49 (2006.01)

(52) U.S. Cl. .................. 250/573; 250/227.11; 356/627

(58) Field of Classification Search ............ 250/227.11, 250/573, 577; 356/627; 385/12–13
See application file for complete search history.

(56) References Cited

U.S. PATENT DOCUMENTS

| | | | |
|---|---|---|---|
| 1,883,971 A | 10/1932 | Krvzanowskv | |
| 3,068,697 A | 12/1962 | Carlson | |
| 3,338,457 A | 8/1967 | Tvoenhof | |
| 3,442,127 A | 5/1969 | Nichols | |
| 3,448,616 A | 6/1969 | Wostl et al. | |
| 3,528,291 A | 9/1970 | Melone | |
| 3,535,934 A | 10/1970 | Raoata | |
| 3,648,521 A | 3/1972 | Amendolia | |
| 3,796,098 A | 3/1974 | Traver | |
| 3,834,235 A | 9/1974 | Bouton et al. | |
| 4,132,899 A | 1/1979 | Shigemasa et al. | |
| 4,202,387 A * | 5/1980 | Upton | 141/360 |
| 4,242,590 A | 12/1980 | von Tluck | |
| 4,246,489 A | 1/1981 | Yoshida et al. | |
| 4,354,180 A | 10/1982 | Harding | |
| 4,468,567 A * | 8/1984 | Sasano et al. | 250/577 |
| 4,606,226 A | 8/1986 | Krohn | |
| 4,764,671 A | 8/1988 | Park | |
| 4,809,551 A | 3/1989 | Grossiord | |
| 4,840,137 A | 6/1989 | Beauvais et al. | |
| 4,961,069 A | 10/1990 | Tsaprazis | |
| 4,962,395 A | 10/1990 | Baird | |
| 5,029,471 A | 7/1991 | Goodrich | |
| 5,278,426 A | 1/1994 | Barbier | |
| 5,279,157 A | 1/1994 | Mattis et al. | |
| 5,534,708 A | 7/1996 | Ellinger et al. | |
| 6,448,573 B1 | 9/2002 | Benton | |
| 6,555,837 B1 | 4/2003 | Benton | |

* cited by examiner

*Primary Examiner*—Georgia Epps
*Assistant Examiner*—Patrick J. Lee
(74) *Attorney, Agent, or Firm*—Alvin R. Wirthlin

(57) ABSTRACT

An optical transducer for determining the presence or absence of liquid or the like in a reservoir includes an electrical circuit with a pulse generator and processing electronics to filter out ambient light and compensate for temperature changes. A comparator circuit portion includes a pair of comparators that simultaneously output high and low signals when in the presence of liquid. One of the outputs can be selected to drive an indicator, pump, relay or the like.

19 Claims, 5 Drawing Sheets

OPTICAL TRANSDUCER FOR DETECTING LIQUID LEVEL AND ELECTRICAL CIRCUIT THEREFOR

CROSS-REFERENCE TO RELATED APPLICATIONS

This application is a Continuation-in-Part of U.S. application Ser. No. 10/829,772 filed on Apr. 22, 2004.

BACKGROUND OF THE INVENTION

This invention relates to optical transducers, and more particularly to optical transducers for detecting liquid level and the like.

FIGS. 1A–1C schematically depict a prior art optical transducer 10 for determining liquid level in tanks, vessels or the like. As shown, the transducer 10 includes an optical body 12 with a conical tip 14 at one end thereof, and a light source 16 and photosensor 18 at an opposite end thereof. In the absence of liquid as shown in FIG. 1A, light from the light source 16 is normally projected through the optical body 12 where it is internally reflected at a conical measuring surface 20 of the conical tip 14 and returns to the photosensor 18, as represented by arrow 22. When the conical tip 14 is submerged in liquid, as represented by dashed line 24 in FIG. 1B, the light is refracted out of the conical tip 14 and into the liquid (arrow 26). The amount of light at the photosensor 18 is thus significantly diminished. The presence or absence of liquid on the transducer 10, and thus the level of liquid in a tank, vessel or the like can be ascertained.

However, it has been found that liquid level transducers of above-described type can produce erroneous signals. As shown in FIG. 1C, when the liquid 24 descends to a level below the transducer 10, one or more liquid droplets 28 may form on the conical measuring surface 20 due to the surface tension of the liquid and the surface energy of the surface 20. Consequently, light is refracted out of the conical tip 14 and into the droplet(s) 28, as shown by arrow 26, to thereby give a false liquid level indication. This phenomena can occur whether the transducer 10 is in the horizontal position as shown, or in the vertical position.

In addition to the above, it has previously been difficult to construct a compact optical transducer that is capable of operating through a wide temperature range due to the relative proximity of the light source and photosensor to the liquid being measured.

BRIEF SUMMARY OF THE INVENTION

According to one aspect of the invention, an electrical circuit is provided for a liquid level transducer having a transparent body that is adapted for exposure to a liquid to be measured. The electrical circuit includes a light source adapted for projecting radiant energy into the transparent body and a photosensor adapted for detecting a level of the radiant energy emanating from the transparent body. The level of radiant energy is indicative of the presence or absence of liquid on the transparent body. The electrical circuit also includes a pulsing circuit portion connected to the light source for pulsing the light source between on and off conditions, a rectifier circuit portion connected to the photosensor for rectifying a signal from the photosensor, with the rectified signal being proportional to the detected level of radiant energy, an integrator circuit portion connected to the rectifier circuit portion for temporarily storing the rectified signal, a comparator circuit portion connected to the integrator circuit portion for comparing the rectified signal with a predetermined value, and a load switch portion connected to the comparator circuit portion for switching an external load when the rectified signal is at least one of above and below the predetermined value.

According to a further aspect of the invention, an electrical circuit is provided for a liquid level transducer having a transparent body that is adapted for exposure to a liquid to be measured. The electrical circuit includes a light source adapted for projecting radiant energy into the transparent body and a photosensor adapted for detecting a level of the radiant energy emanating from the transparent body. The level of radiant energy is indicative of the presence or absence of liquid on the transparent body. The electrical circuit further includes a comparator circuit portion connected to the photosensor for comparing the detected level of radiant energy with a predetermined value. The comparator circuit portion has first and second comparators, with the first comparator being configured to output a high signal when the detected level of radiant energy is above the predetermined value, and the second comparator being configured to output a low signal when the detected level of radiant energy is above the predetermined value. A load switch portion is connected to an output of at least one of the first and second comparators for switching an external load when the detected level of radiant energy is at least one of above and below the predetermined value.

According to yet a further aspect of the invention, an optical transducer for determining the presence or absence of liquid in a reservoir comprises a housing with a hollow interior and an optical probe that extends through the housing with a proximal end of the optical probe being positioned in the hollow interior and a distal end of the optical probe being positioned outside of the housing. A light source is positioned for projecting radiant energy into the optical probe toward the distal end. A photosensor is positioned for detecting a level of radiant energy reflected from the distal end, with the level of radiant energy being indicative of the presence or absence of liquid on the optical probe. A comparator circuit portion is connected to the photosensor for comparing the detected level of radiant energy with a predetermined value. The comparator circuit portion comprises first and second comparators, with the first comparator being configured to output a high signal when the detected level of radiant energy is above the predetermined value, and the second comparator being configured to output a low signal when the detected level of radiant energy is above the predetermined value. A load switch portion is connected to an output of at least one of the first and second comparators for switching an external load when the detected level of radiant energy is at least one of above and below the predetermined value.

BRIEF DESCRIPTION OF THE DRAWINGS

The foregoing summary as well as the following detailed description of the preferred embodiments of the present invention will be best understood when considered in conjunction with the accompanying drawings, wherein like designations denote like elements throughout the drawings, and wherein.

It is noted that the drawings are intended to depict only typical embodiments of the invention and therefore should not be considered as limiting the scope thereof. It is further noted that the drawings may not be necessarily to scale. The invention will now be described in greater detail with reference to the accompanying drawings.

DETAILED DESCRIPTION OF THE INVENTION

Figure 1A:
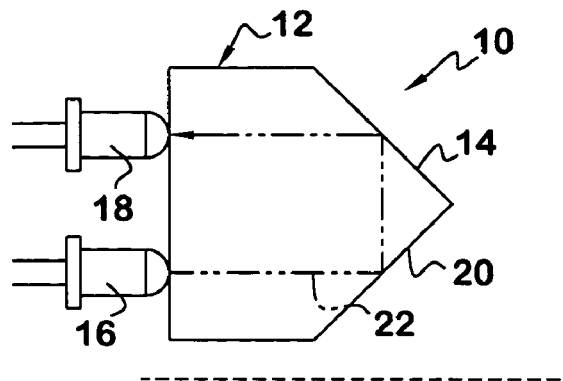
FIG. 1A is a schematic view of a prior art optical liquid level transducer in a first operating condition.
Figure 1B:
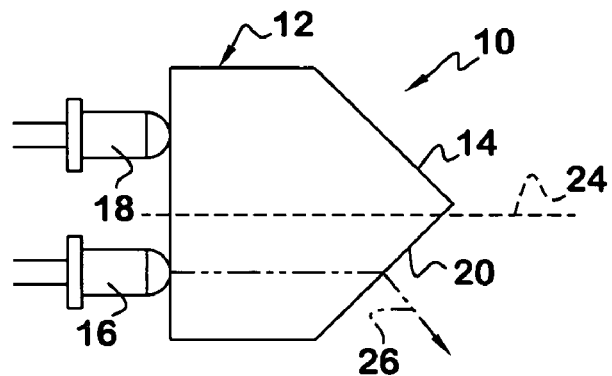
FIG. 1B is a view similar to FIG. 1 of the prior art optical liquid level transducer in a second operating condition.
Figure 1C:
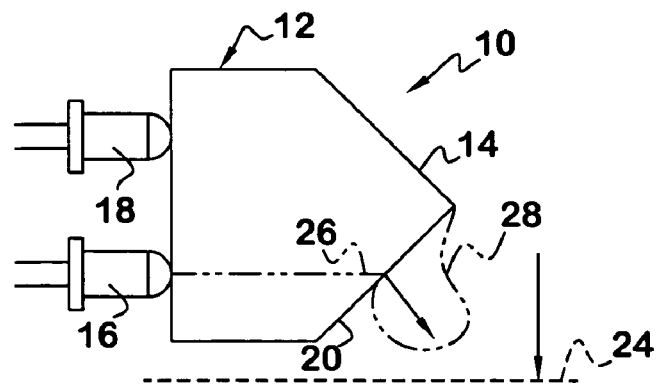
FIG. 1C is a view similar to FIG. 1 of the prior art optical liquid level transducer in a failure condition.
Figure 2:
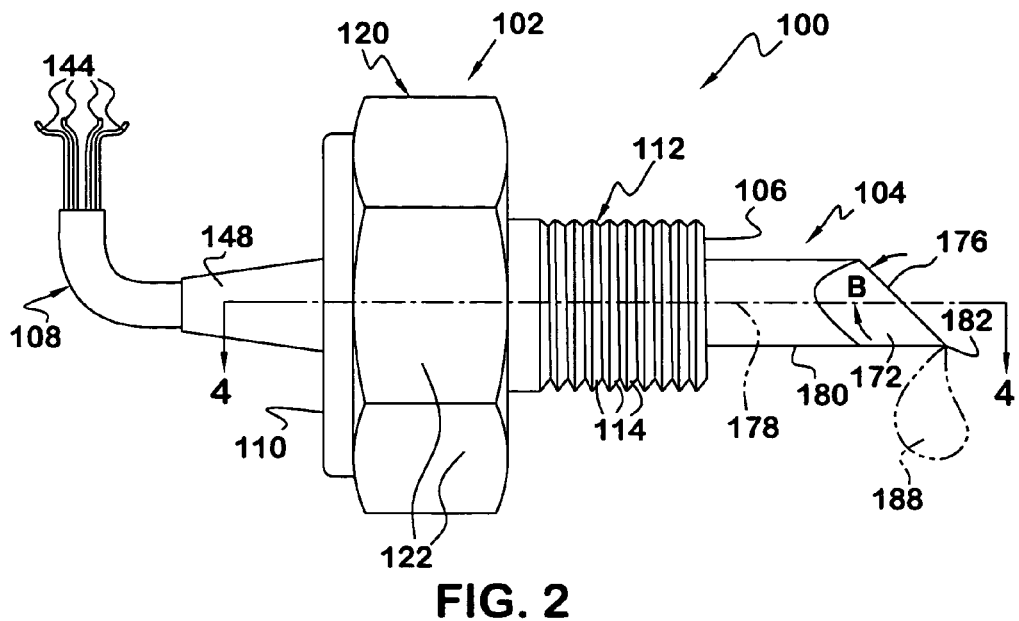
FIG. 2 is a side elevational view of an optical liquid level transducer in accordance with the invention.
Figure 3:
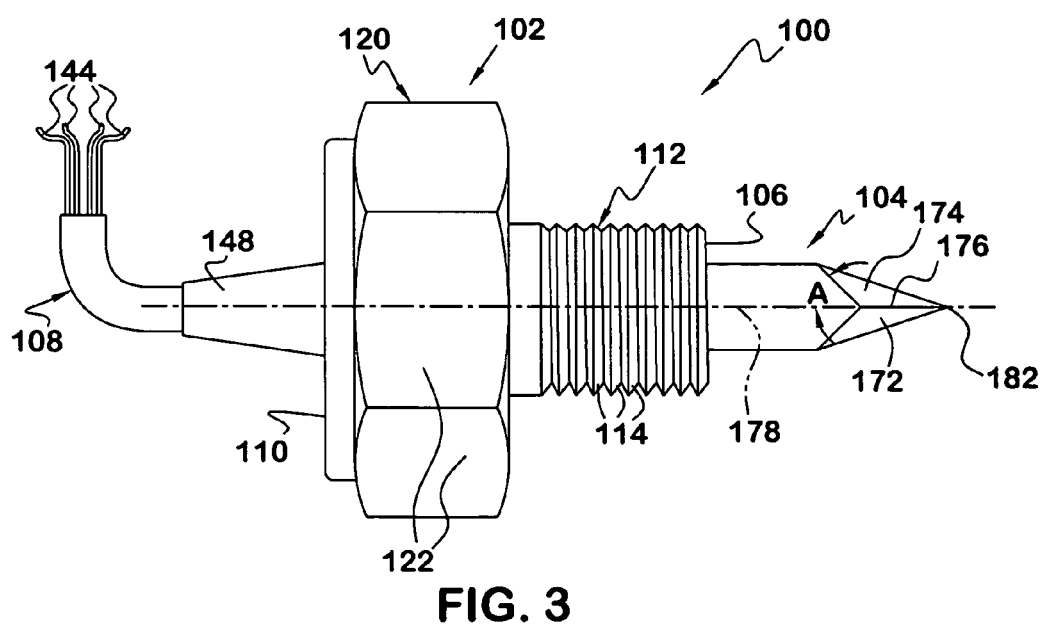
FIG. 3 is a top plan view of the optical liquid level transducer of FIG. 2.

Referring to the drawings and to FIGS. 2 and 3 in particular, an optical liquid level transducer 100 in accordance with the present invention is illustrated. The optical transducer 100 preferably includes a housing 102, an optical probe 104 extending from a distal end 106 of the housing 102, and a wiring harness 108 extending from an opposite proximal end 110 of the housing.

Figure 4:
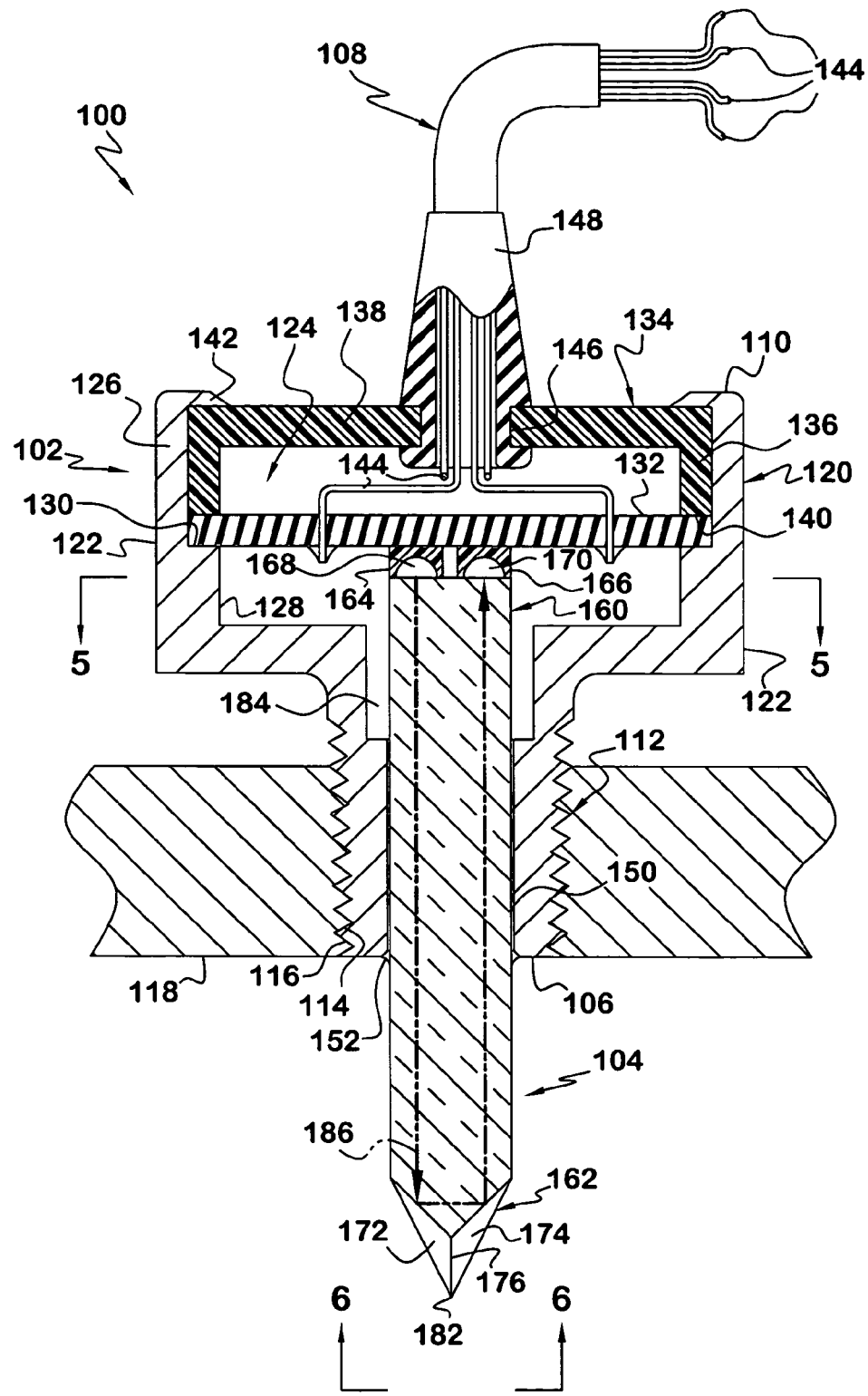
FIG. 4 is a sectional view of the optical liquid level transducer taken along line 4—4 of FIG. 2.
Figure 5:
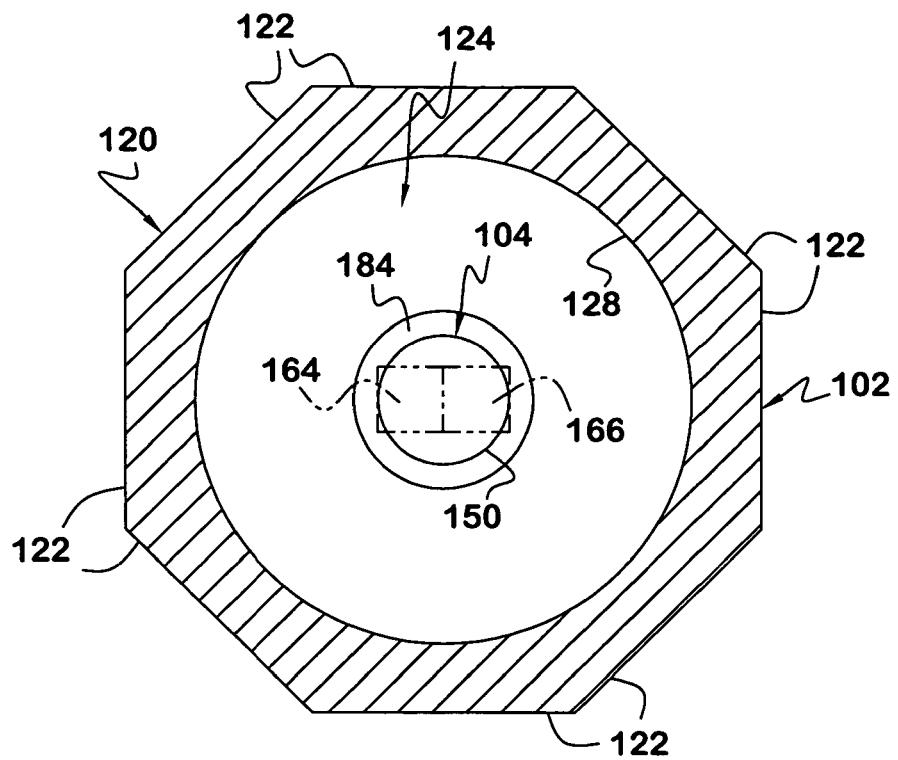
FIG. 5 is a sectional view of the optical liquid level transducer taken along line 5—5 of FIG. 4.
Figure 6:
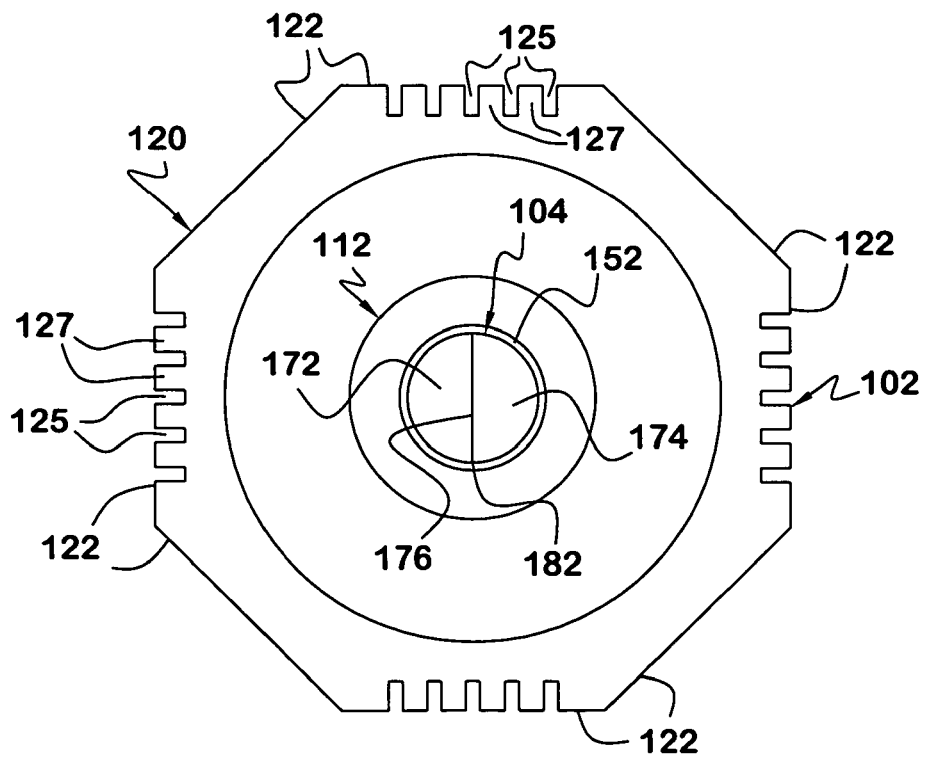
FIG. 6 is an end view of the optical liquid level transducer as seen in the direction of line 6—6 of FIG. 4, in accordance with a further embodiment of the invention.

With additional reference to FIGS. 4 and 5–6, the housing 102 is preferably constructed of a metal material, such as brass. The housing 102 includes a mounting section 112 with external threads 114 for engagement with internal threads 116 of a reservoir housing 118, which may be in the form of a tank, vessel, container or the like. The housing 102 also preferably includes a securing section 120 with generally flat, external faces 122 for engagement by a wrench or the like (not shown) for installing and removing the optical liquid level transducer 100 with respect to the reservoir housing 118 in a well-known manner. It will be understood that the housing 102 can be constructed of other materials such as plastic or ceramic. The particular configuration of the housing 102 will largely depend on the mounting arrangement of the reservoir housing 118. Accordingly, the external threads 114 and external faces 122 may be eliminated and other mounting means may be provided. The securing section 120 has a wall 126 with the external faces 122 formed thereon and a generally cylindrical interior cavity 124 delimited by an interior surface 128 of the wall.

In accordance with a further embodiment of the invention as shown in FIG. 6, one or more of the external faces 122 may be provided with cooling grooves 125 and/or fins 127 (FIG. 6) extending generally parallel with a longitudinal axis 178 of the housing. The grooves and/or fins increase the outer surface area of the housing 102 so that heat within the housing 102 can be more efficiently transferred to the outside environment. In this manner, the electronics and other components located within the housing may have lower temperature requirements. It will be understood that the grooves and/or fins have any orientation with respect to the central axis 178.

An annular step 130 is formed in the interior surface 128 for supporting a circuit board 132 within the cavity 124. An end cap 134 has an annular side wall portion 136 and a plate or disk portion 138 connected to the side wall portion. The annular side wall portion 136 is preferably in sealing engagement with the interior surface 128 of the wall 126. An end 140 of the annular side wall portion 136 opposite the disk portion 138 abuts the circuit board 132 and holds it in place against the annular step 130. An annular flange 142 of the wall 126 can be pressed, rolled or otherwise deformed over the plate portion 138 to hold the end cap and circuit board in the interior cavity 124. It will be understood that other means for holding the components together can be employed, such as adhesive, welding, heat staking, and so on.

Electrical wires 144 from the circuit board 132 exit the housing 102 through a central opening 146 formed in the plate portion 138. A strain relief device 148 may be mounted in the opening 146 with the wires 144 extending therethrough in a well known manner.

In accordance with a further embodiment of the invention, the wires, strain relief device and/or end cap may be replaced with a male or female plug portion with electrical connectors (not shown) for mating with a female or male plug portion (not shown), respectively, of the vehicle or system on which the liquid level transducer 100 is to be installed.

The mounting section 112 has a central bore 150 that, before installation of the optical probe 104, intersects the interior cavity 124. The optical probe 104 extends through the central bore 140 and is preferably sealingly connected to the mounting section 112 at the distal end 106 of the housing 102 through an epoxy adhesive layer 152 or the like to prevent liquid from entering the bore 140 and interior cavity 124. It will be understood that other means for connecting and/or sealing the optical probe to the housing can be used, such as press-fitting the probe in the housing, insert or injection molding the probe directly to the housing, using one or more O-rings between the probe and housing, ultrasonically welding the probe to the housing, using other types of adhesives and sealants, and so on.

The optical probe 104 is preferably in the form of a transparent body of generally elongate cylindrical shape with a proximal end 160 and a distal measurement end 162. However, it will be understood that the optical probe 104 can have other cross dimensional shapes, such as oval, square, triangular, and so on.

It will be understood that the term "transparent" as used herein refers to a material condition that ranges from optically clear to opaque for various wavelengths of radiant energy. By way of example, some materials that allow transmission of a substantial amount of radiant energy in the visible light region of the electromagnetic spectrum may not allow significant transmission of radiant energy in the infrared or other regions. Accordingly, a suitable transparent material would allow the transmission of a measurable amount of radiant energy of a selected wave length through the probe 104. By way of example, the probe 104 can be constructed of glass material such as borosilicate or quartz; Teflon® material such as PTFE, FEP, ETFE; plastic material such as acrylic, nylon, polysulfone, polyetherimide, silicon, polyurethane, polycarbonate, and so on. However, it will be understood that the present invention is not limited to the particular materials described.

The proximal end 160 of the optical probe 104 preferably abuts or is at least closely adjacent to a light source 164 and photosensor 166 mounted on the circuit board 132.

The light source 164 is preferably of the LED type, and both the light source and photosensor can be surface-mount devices with recessed light emitting and light detecting areas 168 and 170, respectively, to both efficiently couple the devices to the optical probe 104 and prevent the direct transmission of stray light from the light source to the photosensor. By way of example, a suitable light source may be a high brightness surface-mount LED, such as Vishay TLM 33 series or TSMS3700. Likewise, a suitable photosensor may be a surface-mount phototransistor, such as Vishay TEMT3700.

A suitable combination light source/photosensor pair 165 (shown in dashed line in FIG. 7) may alternatively be used. One such combination is a reflective object sensor, such as QRD1114 provided by Fairchild Semiconductor. The reflective object sensor includes an integrated infrared LED emitter 164 and phototransistor 166 in a single package. Preferably, the measurement side of the reflective object sensor abuts the proximal end 160 or is at least closely adjacent thereto.

It will be understood that other light sources can be used, such as, without limitation, incandescent bulbs, laser diodes, or any other source that emits radiant energy in one or more of the visible, ultra-violet, or infra-red spectrums. It will be further understood that other photosensors can be used, such as, without limitation, photocells, photodiodes, and photoconductors. In accordance with yet a further embodiment of the invention, a single integrated unit such as a proximity sensor having both the light source and the photosensor may be used.

It will be further understood that the position of the light source and photosensor may be reversed or located at other positions on the proximal end 160 of the optical probe 104. In addition, the light source and photosensor may be remotely located from the proximal end of the optical probe and positioned for emitting light into the optical probe and receiving light therefrom, respectively, through intermediate members such as fiber optics, transparent rods, or other suitable light guides.

The distal measurement end 162 of the optical probe 104 has a first measurement surface 172 and a second measurement surface 174. The first and second measurement surfaces intersect at a transverse edge 176. Preferably, each measurement surface 172,174 forms an acute angle A with respect to the central axis 178, as shown in FIG. 3. In addition, the edge 176 preferably forms an acute angle B with respect to the central axis 178, as shown in FIG. 2. The edge 176 together with the outer surface 180 of the probe form a pointed probe apex or tip 182. Preferably, angles A and B are each approximately 45 degrees. It will be understood, however, that angles A and B can vary over a wide range depending on the type of light source used and/or the liquid(s) to be measured. It will be further understood that the probe tip 182 need not be pointed. In addition, more than one edge 176 can be provided with more than two intersecting measurement surfaces.

As best shown in FIGS. 4 and 5, with the optical probe 104 installed in the housing 102, an annular gap 184 is formed in the interior cavity 124 between the housing 102 and the probe 104. The annular gap 184 surrounds the probe 104 and serves as an insulative barrier between the housing and proximal end 160 of the probe. Accordingly, heat transfer between the wall 126 of the housing 102 and the probe 104 occurs by convection through the gap 184 rather than by conduction to thereby limit the temperature of the proximal end 160 of the probe. The temperature of the proximal end 160 can also be controlled through heat conduction with the reservoir housing 118. As shown in FIG. 4, the reservoir housing 118 may serve as a heat sink to draw heat away from the optical probe 104 and the mounting section 112 through conductive heat transfer. If desired, the annular gap 184 and/or a portion of the interior cavity 124 below the circuit board 132 may be filled with insulative material (not shown).

In the absence of liquid, as shown in FIG. 4, light entering the optical probe 104 from the light source 164 is reflected off the measurement surfaces 172,174 and back into the probe, as represented by arrow 186, so that the photosensor 166 can detect at least a portion of the light emitted by the light source 164. The shape of the optical probe 104 encourages any liquid droplet(s) 188 (shown in phantom line in FIG. 2) that may initially be on the measurement surfaces 172, 174 to be expelled from the optical probe 104. The relatively narrow areas at the edge 176 and tip 182 discourage the adhesion of droplets due to the relatively small surface energy at these locations. Accordingly, the droplets will tend to slide under gravity along the edge 176 toward the probe tip 182 where it is expelled from the optical probe 104. In this manner, at least a substantial area of the measurement surfaces are clear of the droplets, whether the probe is in the horizontal or vertical position. Thus, any liquid that may otherwise remain on the measurement surfaces is at least substantially reduced to thereby give greater measurement reliability over prior art optical liquid level detectors.

In order to further reduce the surface energy of the optical probe 104 and repel liquids, a low surface energy film such as Novec™ provided by 3M or other fluorinated polymer or low surface energy material, can be applied at least to the measurement faces 172, 174 of the probe, and preferably to the entire probe surface that will be exposed to liquid. Another suitable film is a silicone hardcoat, such as PHC587 provided by GE Silicones. The film should have a lower index of refraction than the material of the probe 104 so that in the absence of liquid, light from the light source 164 is reflected back into the probe material. By way of example, an optical probe 104 constructed of polysulfone has a refractive index of approximately 1.63. A Novec™ film covering the polysulfone probe has a refractive index of approximately 1.38, while a silicone hardcoat has a refractive index of approximately 1.42. With such an arrangement, it has been found that the voltage differential of the probe between a dry condition and an immersed condition in water is significantly enhanced. It will be understood that a wide range of materials can be used for both the probe tip and the film.

In the presence of liquid, the light from the light source will be refracted out of the optical probe 104 to thereby create a signal change that can be used to trigger a visual or audio indicator to alert an operator that the liquid level in the reservoir 118 is at a predetermined level. Alternatively, the abrupt signal change can be used to automatically start and/or stop operation of a pump or the like (not shown) to fill the reservoir with liquid to a predetermined level.

Where it is desirous to continuously monitor the high and low level of liquid in a reservoir for automatically filling the reservoir to a predetermined level, two of the optical transducers 100 can be used in conjunction with other circuitry to automatically start and stop operation of a pump at the low level and high level, respectively.

Figure 7:
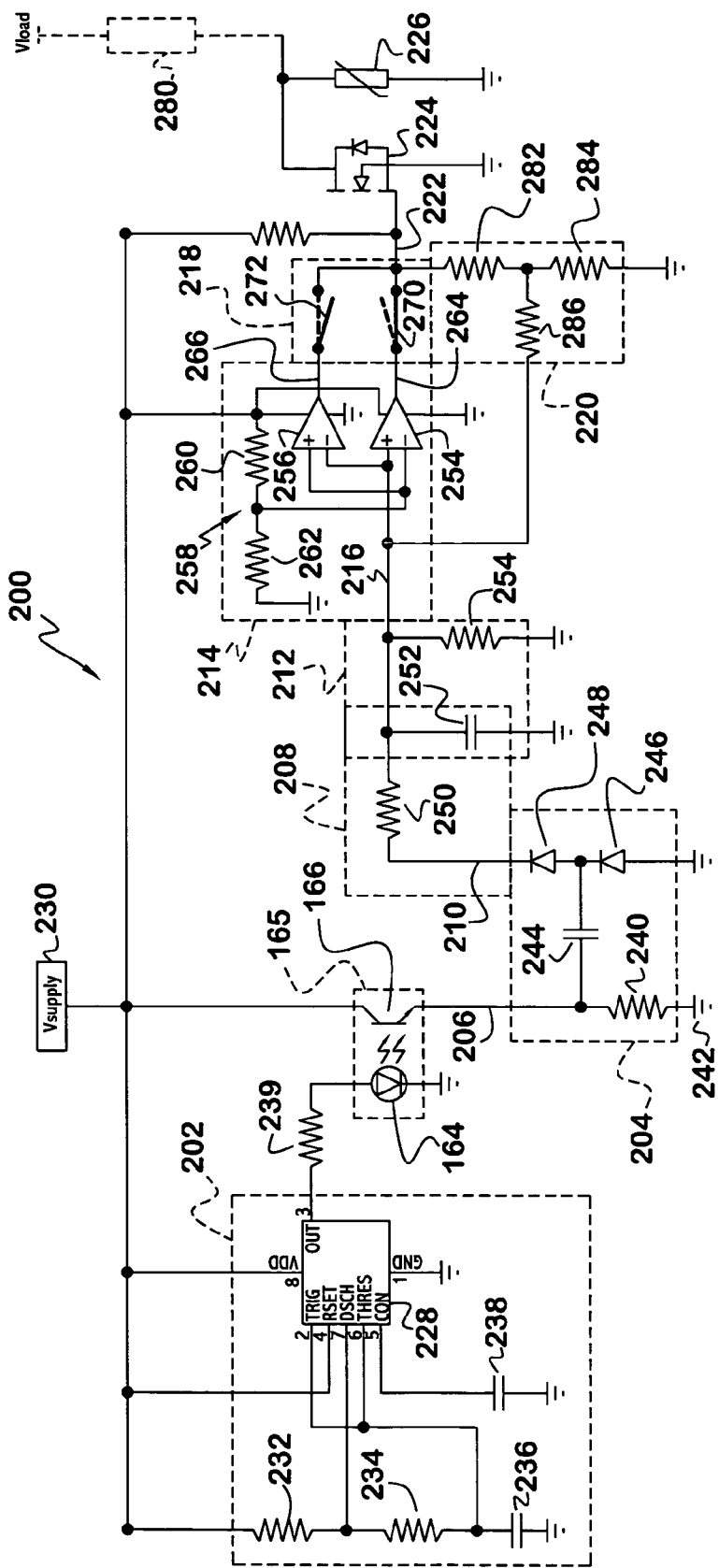
FIG. 7 is an electrical schematic in accordance with the present invention that forms part of the liquid level transducer of FIG. 2.

With reference now to FIG. 7, an electrical circuit 200 in accordance with an exemplary embodiment of the invention for use with the optical liquid level transducer 100 is illustrated. The electrical circuit 200 preferably includes the reflective object sensor 165 as previously described, which has an LED 164 that emits infrared light and a phototransistor 166 that detects reflected infrared light from the LED. It is understood, however, that other light sources and/or photosensors can alternatively be used, as previously described. A pulsing circuit portion 202 is connected the LED 164 and a rectifier circuit portion 204 is in turn connected to the photransistor output 206. An integrator circuit portion 208 is connected to the output 210 of the rectifier circuit portion and a delay timer 212 is connected to, and incorporates part of, the integrator circuit portion 208. A comparator circuit portion 214 is connected to the output 216 of the delay timer 212. A selector switch portion 218 is connected to the comparator circuit portion 212 and an anti-hysteresis circuit portion 220 is connected to the output 222 of the selector switch portion 218 and the output 216 of the delay timer 212. A load switch portion 224 is also connected to the output 222 of the selector switch portion 216. Preferably, the load switch portion 224 is in the form of an N-channel MOS FET. However, other switching means can be used, such as power transistors, relays, and so on. A transient voltage suppressor 226 may be provided in parallel with the load switch portion 224 to protect the load switch portion against voltage spikes.

The pulsing circuit portion 202 includes a pulse generator 228 connected to a regulated power supply 230, as well as resistors 232, 234 and capacitors 236, 238 for creating a square wave that pulses the light source 164 between on and off states at a predetermined frequency and duty cycle. The pulse generator 228 is preferably in the form of a 555 timer IC, although other known means for generating a pulse to the LED can be used. The particular values of the resistors and capacitors determines the frequency and duty cycle of the output pulse in a well-known manner. In operation, the LED 164 is pulsed on and off at a predetermined frequency and duty cycle by the pulse generator. The intensity of the LED during the "on" state can be adjusted by varying the value of a resistor 239 that is connected between the pulse generator 202 and the LED 164.

The rectifier circuit portion 204 includes a resistor 240 connected between the photosensor output 206 and ground 242, a capacitor 244 having a first end connected to the phototransistor output 206 and a second end connected between a pair of diodes 246, 248. When the LED 164 is in the "on" state, the capacitor 244 will charge and pass current to the integrator circuit portion 208 through the diode 248. When the LED 164 is in the "off" state, the capacitor 244 will discharge to ground through the resistor 240. The diode 246 ensures that the discharge path will always be through the resistor 240. Accordingly, any direct current (DC) offset that may be present due to ambient light on the phototransistor 166, leakage current of the phototransistor at elevated temperatures, as well as other noise, can be reduced or eliminated. It is understood that other means for reducing or eliminating noise may alternatively be used.

The integrator circuit portion 208 includes a resistor 250 connected in series with the diode 248 and a capacitor 252 connected between the resistor 250 and ground, while the delay timer 212 includes the capacitor 252 connected in parallel with a resistor 254, which is in turn connected to ground. When the LED is in the "on" state, current from the rectifier circuit portion 204 will pass through the resistor 250 and charge the capacitor 252 to thereby hold or store the peak value of the pulsed signal, which will also be present at the comparator circuit portion 214. When the LED is in the "off" state, the capacitor 252 will discharge to ground through the resistor 254. Preferably, the values of the resistors 250, 254 and the capacitor 252 are chosen such that the charge time of the resistor 250 and capacitor 252 is greater than the discharge time of the resistor 254 and capacitor 252. In this manner, an anti-sloshing feature is realized. When the liquid level within the tank 118 (FIG. 4) or the like approaches a predetermined level, any vibration or sloshing of the liquid may cause the comparator circuit portion 214 and thus the load switch portion 224 to oscillate. With the above-described anti-sloshing feature, rapid switching at the comparator output due to liquid vibration or sloshing is greatly reduced. The particular duration of the time delay can be adjusted by modifying the values of the resistors 250, 254 and the capacitor 252.

The comparator circuit portion 214 includes a first voltage comparator 254, a second voltage comparator 256, and a voltage divider 258 connected to the comparators. The comparators are arranged such that the positive input of the first comparator 254 is connected to the output 216 of the integrator circuit portion 208 and the negative input of the second comparator 256. Likewise, the negative input of the first comparator 254 is connected to the positive input of the second comparator. In this manner, when the output 264 of the first comparator is high, the output 266 of the second comparator 256 will be low, and vise-versa.

The voltage divider 258 includes a first resistor 260 connected to the regulated power supply 230 and a second resistor 262 connected between the first resistor 260 and ground. A voltage divider output 268 is connected between the resistors 260, 262 and extends to the negative input of the first comparator 254 and the positive input of the second comparator 256.

In use, the integrated signal present at the output of the integrator circuit portion is compared to a predetermined voltage signal as defined by the voltage divider 258. When the integrated signal is higher than the predetermined signal, the output 264 of the first comparator 254 will be high and the output 266 of the second comparator will be low. Likewise, when the integrated signal is lower than the predetermined signal, the output 264 of the first comparator 254 will be low and the output 266 of the second comparator will be high. Adjustment of the predetermined voltage signal can be accomplished by adjusting the values of one or more of the resistors 260, 262. It is understood that one or both resistors may be replaced with one or more potentiometers to thereby provide a manually adjustable threshold setting.

The selector switch portion 218 includes a first switch segment 270 connected to the output 264 of the first comparator 254 and a second switch segment 272 connected to the output 266 of the second comparator. As shown, when the first switch segment 270 is in a closed position, the second switch segment 272 is open. Likewise, when the first switch segment 270 is open (shown in dashed line), the second switch segment 272 is closed (shown in dashed line). In this manner, the output from only one of the voltage comparators will be connected to the output 222 of the selector switch portion 218. This feature is especially advantageous since a single circuit board can be manufactured for two different modes of operation and selectively switched to the desired mode. In the first mode, the load switch portion 224 is closed when the optical probe 104 (FIG. 4) of the optical transducer 10 is dry, and open when the optical probe 104 is immersed in liquid. In the second mode, the load switch portion 224 is open when the optical probe 104 is dry, and closed when the optical probe 104 is immersed in liquid.

By way of example, depending on the position of the optical probe 104 within a tank 118 or the like, the first operational mode can be used to stop operation of a pump, relay, or other load 280 (as represented by dashed line in FIG. 7) and/or to inform an observer that liquid in the tank has descended below a predetermined level through a visual and/or audio indicator, or other load 280 when liquid in the tank reaches a predetermined level. Likewise, the second mode of operation can be used to start operation of a pump, relay or other load 280 when liquid in the tank descends below a predetermined level and/or to inform an observer that the liquid in the tank has risen above a predetermined level.

The first and second switch segments are preferably in the form of jumper wires that are directly soldered to the circuit board during manufacture. One of the wires can then be cut so that only one mode of operation is available. It is understood that other means for switching between the two operational modes can be used, such as one or more manually selectable switches, jumper pins, traces that can be cut during manufacture, a zero or low Ohm resistor placed at either the first or second switch segment position, and so on.

The anti-hysteresis circuit portion 220 includes a first resistor 282 connected to the output 222 of the selector switch portion 218, a second resistor 284 connected between the first resistor 282 and ground, and a third resistor 286 having one end connected between the first and second resistors 282, 284 and another end connected to the positive input of the first comparator 254 and the negative input of the second comparator 256. Preferably, the values of the resistors 282, 284 and 286 are selected such that once the selected comparator switches states, i.e. from a high state to a low state or vice-versa, a predetermined offset voltage is added to the appropriate input of the selected comparator to thereby prevent oscillation at the switch threshold. Accordingly, oscillation of the load switch portion 224 is prevented.

It will be appreciated by those skilled in the art that changes could be made to the embodiments described above without departing from the broad inventive concept thereof. Although the present invention has been described in conjunction with detecting the presence or absence of a liquid, it will be understood that the term "liquid" can refer to any material (whether fluent or solid) that, when in contact with the optical probe, causes a measurable change in light intensity as detected by the photosensor. It will be understood, therefore, that this invention is not limited to the particular embodiments disclosed, but it is intended to cover modifications within the spirit and scope of the present invention as defined by the appended claims.

I claim:

1. A liquid level transducer, having a transparent body adapted for exposure to a liquid to be measured, the liquid level transducer comprising:
an electrical circuit comprising:
a light source for projecting radiant energy into the transparent body;
a photosensor for detecting a level of the radiant energy emanating from the transparent body, the level of radiant energy being indicative of the presence or absence of liquid on the transparent body;
a pulsing circuit portion connected to the light source for pulsing the light source between on and off conditions;
a rectifier circuit portion connected to the photosensor for rectifying a signal from the photosensor, the rectified signal being proportional to the detected level of radiant energy;
an integrator circuit portion connected to the rectifier circuit portion for temporarily storing the rectified signal;
a comparator circuit portion connected to the integrator circuit portion for comparing the rectified signal with a predetermined value; and
a load switch portion connected to the comparator circuit portion for switching an external load when the rectified signal is at least one of above and below the predetermined value;
wherein the comparator circuit portion comprises first and second comparators, the first comparator being configured to output a high signal to the load switch portion when the rectified signal is above the predetermined value, the second comparator being configured to output a low signal to the load switch portion when the rectified signal is above the predetermined value.

2. A liquid level transducer according to claim 1, and further comprising a selector switch portion connected between the outputs of the first and second comparators and the load switch portion for selecting the output of only one of the comparators.

3. A liquid level transducer according to claim 1, and further comprising an anti-hysteresis circuit portion connected to the inputs and outputs of the comparators to prevent oscillation of the load switch portion.

4. A liquid level transducer, having a transparent body adapted for exposure to a liquid to be measured, the liquid level transducer comprising:
an electrical circuit comprising:
a source for projecting radiant into the transparent body;
a photosensor for detecting a level of the radiant energy emanating from the transparent body, the level of radiant energy being indicative of the presence or absence of liquid on the transparent body;
a pulsing circuit portion connected to the light source for pulsing the light source between on and off conditions;
a rectifier circuit portion connected to the photosensor for rectifying a signal from the photosensor, the rectified signal being proportional to the detected level of radiant energy;
an integrator circuit portion connected to the rectifier circuit for temporarily storing the rectified signal;
a comparator circuit portion connected to the integrator circuit portion for comparing the rectified signal with a predetermined value;
a load switch portion connected to the comparator circuit portion for switching an external load when the rectified signal is at least one of above and below the predetermined value; and
a delay timer connected between the integrator circuit portion and the comparator circuit portion to thereby prevent or reduce false signaling due to liquid sloshing.

5. A liquid level transducer according to claim 4, wherein the integrator circuit portion comprises a first resistor in series with a capacitor and the delay timer comprises a second resistor in parallel with the capacitor.

6. An electrical circuit for a liquid level transducer having a transparent body adapted for exposure to a liquid to be measured, the electrical circuit comprising:
a light source adapted for projecting radiant energy into the transparent body;
a photosensor adapted for detecting a level of the radiant energy emanating from the transparent body, the level of radiant energy being indicative of the presence or absence of liquid on the transparent body;
a comparator circuit portion connected to the photosensor for comparing the detected level of radiant energy with a predetermined value, the comparator circuit portion comprising first and second comparators, the first comparator being configured to output a high signal when the detected level of radiant energy is above the predetermined value, the second comparator being configured to output a low signal when the detected level of radiant energy is above the predetermined value; and a load switch portion connected to an output of at least one of the first and second comparators for switching an external load when the detected level of radiant energy is at least one of above and below the predetermined value.

7. An electrical circuit according to claim 6, and further comprising a selector switch portion connected between the outputs of the first and second comparators and the load switch portion for selecting the output of only one of the comparators.

8. An electrical circuit according to claim 7, and further comprising an anti-hysteresis circuit portion connected to the inputs and outputs of the comparators to prevent oscillation of the load switch portion.

9. An electrical circuit according to claim 6, and further comprising an anti-hysteresis circuit portion connected to the inputs and outputs of the comparators to prevent oscillation of the load switch portion.

10. An optical transducer for determining the presence or absence of liquid in a reservoir, the optical transducer comprising:

a housing having a hollow interior;

an optical probe extending through the housing, the optical probe having a proximal end positioned in the hollow interior and a distal end positioned outside of the housing;

electrical circuitry for determining the presence or absence of liquid on the distal end of the optical probe, the electrical circuitry comprising:

a light source positioned for projecting radiant energy into the optical probe toward the distal end;

a photosensor positioned for detecting a level of radiant energy reflected from the distal end, the level of radiant energy being indicative of the presence or absence of liquid on the optical probe;

a comparator circuit portion connected to the photosensor for comparing the detected level of radiant energy with a predetermined value, the comparator circuit portion comprising first and second comparators, the first comparator being configured to output a high signal when the detected level of radiant energy is above the predetermined value, the second comparator being configured to output a low signal when the detected level of radiant energy is above the predetermined value; and a load switch portion connected to an output of at least one of the first and second comparators for switching an external load when the detected level of radiant energy is at least one of above and below the predetermined value.

11. An optical transducer according to claim 10, and further comprising a selector switch portion connected between the outputs of the first and second comparators and the load switch portion for selecting the output of only one of the comparators.

12. An optical transducer according to claim 11, and further comprising an anti-hysteresis circuit portion connected to the inputs and outputs of the comparators to prevent oscillation of the load switch portion.

13. An optical transducer according to claim 10, and further comprising an anti-hysteresis circuit portion connected to the inputs and outputs of the comparators to prevent oscillation of the load switch portion.

14. An optical transducer according to claim 10, and further comprising:

a pulsing circuit portion connected to the light source for pulsing the light source between on and off conditions;

a rectifier circuit portion connected to the photosensor for rectifying a signal from the photosensor, the rectified signal being proportional to the detected level of radiant energy; and an integrator circuit portion connected between the rectifier circuit portion and the comparator circuit portion for temporarily storing the rectified signal.

15. An electrical circuit according to claim 14, and further comprising a delay timer connected between the integrator circuit portion and the comparator circuit portion to thereby prevent or reduce false signaling due to liquid sloshing.

16. An electrical circuit according to claim 15, wherein the integrator circuit portion comprises a first resistor in series with a capacitor and the delay timer comprises a second resistor in parallel with the capacitor.

17. An optical transducer according to claim 14, and further comprising a selector switch portion connected between the outputs of the first and second comparators and the load switch portion for selecting the output of only one of the comparators.

18. An optical transducer according to claim 14, and further comprising an anti-hysteresis circuit portion connected to the inputs and outputs of the comparators to prevent oscillation of the load switch portion.

19. An optical transducer according to claim 10, wherein the light source and the photosensor are positioned within the hollow interior of the housing.

* * * * *